US010270856B2

(12) United States Patent
Nozawa et al.

(10) Patent No.: US 10,270,856 B2
(45) Date of Patent: Apr. 23, 2019

(54) INFORMATION STORAGE SYSTEM AND INFORMATION STORAGE METHOD

(71) Applicant: Murata Manufacturing Co., Ltd., Kyoto (JP)

(72) Inventors: Nobuyuki Nozawa, Kyoto (JP); Chiho Ikeda, Kyoto (JP); Takahiro Watanabe, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 645 days.

(21) Appl. No.: 14/925,049

(22) Filed: Oct. 28, 2015

(65) Prior Publication Data

US 2016/0050278 A1 Feb. 18, 2016

Related U.S. Application Data

(63) Continuation of application No. PCT/JP2013/083549, filed on Dec. 16, 2013.

(30) Foreign Application Priority Data

Apr. 30, 2013 (JP) .................................. 2013-095968

(51) Int. Cl.
G06F 15/16 (2006.01)
H04L 29/08 (2006.01)
(Continued)

(52) U.S. Cl.
CPC ........ *H04L 67/1097* (2013.01); *G06F 3/0362* (2013.01); *G06F 3/0487* (2013.01); *G06F 3/0488* (2013.01); *H04L 67/24* (2013.01)

(58) Field of Classification Search
CPC ........................... H04L 67/1097; G06F 3/0362
(Continued)

(56) References Cited

U.S. PATENT DOCUMENTS

2009/0313493 A1* 12/2009 Ide .................... G06F 1/3203
713/323
2012/0100876 A1* 4/2012 Anderson ........... H04M 1/6091
455/466
(Continued)

FOREIGN PATENT DOCUMENTS

| CN | 200969571 Y | 10/2007 |
|---|---|---|
| JP | H10-51551 A | 2/1998 |
| JP | 2001-028773 A | 1/2001 |
| JP | 2002-073466 A | 3/2002 |
| JP | 2003-281047 A | 10/2003 |

(Continued)

OTHER PUBLICATIONS

English Translation of Japanese Office Action for Patent Application No. 2015-514744 dated Sep. 21, 2016.
(Continued)

*Primary Examiner* — Dustin Nguyen
*Assistant Examiner* — Joel Mesa
(74) *Attorney, Agent, or Firm* — Pearne & Gordon LLP

(57) ABSTRACT

An information storage system and an information storage method allow necessary information to be stored in the proper amount with a simple operation for people to share the information. The system includes an input unit including a plurality of press-type switches each of which accepts input for an on-signal or an off-signal and a data server storing pieces of identification information each identifying a corresponding one of the switches and messages in association with each other and outputs, in response to input accepted by each of the switches, a corresponding one of the messages. The input unit transmits an on-signal or an off-signal and a piece of identification information to the data server. The data server receives the on-signal or the off-signal and the piece of identification information and extracts and outputs a message associated with the piece of
(Continued)

identification information received together with the on-signal.

18 Claims, 15 Drawing Sheets

(51) Int. Cl.
 *G06F 3/0487* (2013.01)
 *G06F 3/0488* (2013.01)
 *G06F 3/0362* (2013.01)

(58) Field of Classification Search
 USPC .................................................. 709/219, 217
 See application file for complete search history.

(56) References Cited

U.S. PATENT DOCUMENTS

2014/0006167 A1* 1/2014 Korn ...................... H04W 4/21
 705/14.64

2014/0325391 A1* 10/2014 Zhang ..................... H04L 51/04
 715/753

FOREIGN PATENT DOCUMENTS

| JP | 2004-334308 A | 11/2004 |
| JP | 2005-267159 A | 9/2005 |
| JP | 2011-145853 A | 7/2011 |
| JP | 2012-027598 A | 2/2012 |

OTHER PUBLICATIONS

Notification of the First Office Action issued in Chinese Patent Application No. 201380076076 dated May 12, 2017.
International Search Report issued in Application No. PCT/JP2013/083549 dated Mar. 18, 2014.
Translation of Written Opinion issued in Application No. PCT/JP2013/083549 dated Mar. 18, 2014.

* cited by examiner

FIG. 7

| BUTTON ID | MESSAGE | ON-FLAG |
|---|---|---|
| ×××  | MILK | 1 |
| ×××  | SUGAR | 1 |
| ×××  | RICE | 0 |
| ⋮ | ⋮ | ⋮ |

INFORMATION STORAGE SYSTEM AND INFORMATION STORAGE METHOD

BACKGROUND

Technical Field

The present disclosure relates to an information storage system and an information storage method that allow people to easily store brief information even when both hands are occupied and allow a plurality of people to share the stored information.

With the spread of smartphones, an environment that permits the use of various computer applications is becoming available in ordinary homes. In particular, in a wireless LAN environment, high-speed secure information transmission and reception can be performed only between terminals located in a home.

Both hands are usually used for input on smartphones, tablet terminals, and the like. For example, the user operates a touchscreen of a tablet terminal with their right hand while holding the tablet terminal with their left hand. When the user inputs some kind of information as text data, the user operates the touchscreen to input and store the text data.

In addition, when it is necessary to share, among a plurality of people, text data that has been input and stored, for example, bulletin board systems are often used. Patent Document 1 discloses a bulletin board system and a posting method for small terminals used to share, among a plurality of people, text data that has been input and stored. In Patent Document 1, the bulletin board system is made more user-friendly by implementing an optimum screen display regardless of whether the screen used is a screen of a PC or a screen of a small mobile terminal device.

Patent Document 1: Japanese Unexamined Patent Application Publication No. 2002-073466

BRIEF SUMMARY

The bulletin board system disclosed in Patent Document 1 implements sharing of text data but requires the text data to be input as misunderstanding-free information. This necessitates inputting the text data accurately using the correct grammar. However, information is not necessarily required, in all situations, to be text data input using the correct grammar.

For example, in homes, family members can efficiently lead a family life by sharing fragmentary information, such as "ran out of milk" or "bread almost finished". In this case, detailed information is not needed as the text data, and the text data often just needs to indicate the situation.

In addition, there are cases where it is difficult to input text data, for example, because a person cannot use both hands or operate an input device when the person determines to leave certain information. Input of the text data can be deterred; however, such cases can be a cause of forgetting to input the text data, and the information that has been determined to be left is often lost.

The present disclosure provides an information storage system and an information storage method that allow necessary information to be stored in the proper amount with a simple operation and allow a plurality of people to share the stored information.

To this end, an information storage system according to the present disclosure includes an input unit including a plurality of press-type switches each of which accepts input for an on-signal or an off-signal; and a data server that stores pieces of identification information each identifying a corresponding one of the switches and messages in association with each other and that outputs, in response to input accepted by each of the switches, a corresponding one of the messages. The input unit and the data server are connected to each other to be able to perform data communication. The input unit includes signal transmitting means for transmitting an on-signal or an off-signal, and a piece of identification information to the data server. The data server includes signal receiving means for receiving the on-signal or the off-signal, and the piece of identification information, and output means for extracting and outputting a message associated with the piece of identification information received together with the on-signal.

In the configuration described above, the input unit includes the plurality of press-type switches, and a message to be output in response to pressing of each of the switches is stored in association with the switch. Thus, a message having a specific meaning can be surely output in accordance with the position of the pressed switch. In addition, a desired message can be output simply by pressing the press-type switch. Thus, a person can cause a desired message to be output by pressing the press-type switch with a part of their body, such as the elbow or the second joint of a bent finger, even when both hands are occupied, for example.

In addition, in the information storage system according to the present disclosure, the data server may store, for each of the pieces of identification information, information indicating an on-state.

In the configuration described above, information indicating an on-state is stored for each of the pieces of identification information that is associated with a corresponding stored message. Thus, an output status of each message, which changes in response to pressing of the corresponding press-type switch, can be correctly grasped.

In addition, in the information storage system according to the present disclosure, the data server may store, upon receipt of the on-signal, information indicating an on-state in association with the piece of identification information, and determine, upon receipt of the off-signal, whether information indicating an on-state is stored in association with the piece of identification information and delete the information indicating an on-state in a case where the information indicating an on-state is stored.

In the configuration described above, upon receipt of the on-signal, the data server stores information indicating an on-state in association with the piece of identification information. Upon receipt of the off-signal, the data server deletes information indicating an on-state if the information indicating an on-state is stored in association with the piece of identification information. In this way, on/off control can be performed in terms of output of a desired message simply by pressing a press-type switch.

In addition, the information storage system according to the present disclosure may further include a terminal unit connected to the data server to be able to perform data communication. The terminal unit may include display means for displaying the message output from the data server.

In the configuration described above, the terminal unit is capable of displaying a message output from the data server. Thus, a desired message can be shared among a plurality of people.

In addition, in the information storage system according to the present disclosure, the terminal unit may include delete request accepting means for accepting input of a delete request to delete a displayed message, and delete request transmitting means for transmitting, to the data server, the message indicated by the delete request and a corresponding piece of identification information, and the data server may include delete request receiving means for receiving the message indicated by the delete request and the corresponding piece of identification information, and deleting means for deleting information indicating an on-state associated with the received piece of identification information.

In the configuration described above, the terminal unit is capable of accepting input of a delete request to delete a displayed message, and the data server is capable of deleting information indicating an on-state that is associated with the message. Thus, a message displayed on the terminal unit can be hidden upon the matter indicated by the message being completed.

In addition, in the information storage system according to the present disclosure, the input unit may include a human presence sensor that detects presence of a person, and the input unit may be supplied with electric power upon the human detection sensor detecting presence of a person.

In the configuration described above, electric power is supplied to the input unit only in the case where the human presence sensor detects the presence of a human. Thus, the power consumption can be minimized.

In addition, in the information storage system according to the present disclosure, the data server may determine whether an on-signal and an off-signal for the same piece of identification information have been received a certain number of times or more in a certain period, determine, upon determining that the on-signal and the off-signal for the identical piece of identification information have been received the certain number of times or more, whether the number of times of the reception in the certain period is an odd number, and output, upon determining that the number of times of the reception in the certain period is an odd number, a message associated with the received piece of identification information together with an urgency flag.

In the configuration described above, it is determined whether an on-signal and an off-signal have been received together with the same piece of identification information a certain number of times or more in a certain period. If an on-signal and an off-signal have been received, it is determined whether the number of times of the reception in the certain period is an odd number. If it is determined that the number of times of the reception is an odd number, the message corresponding to the received piece of identification information is output together with an urgency flag. In this way, in the case where the same press-type switch is repeatedly pressed with a certain frequency or higher, the urgency flag which indicates an urgent matter can be attached. Thus, an action according to the urgency level can be prompted by changing the color or size used to display the message.

To this end, an information storage method according to the present disclosure is executable by a system including an input unit including a plurality of press-type switches each of which accepts input for an on-signal or an off-signal, and a data server that stores pieces of identification information each identifying a corresponding one of the switches and messages in association with each other and that outputs, in response to input accepted by each of the switches, a corresponding one of the messages, the input unit and the data server being connected to each other to be able to perform data communication, wherein the input unit transmits an on-signal or an off-signal, and a piece of identification information to the data server, and wherein the data server receives the on-signal or the off-signal, and the piece of identification information, and extracts and outputs a message associated with the piece of identification information received together with the on-signal.

In the configuration described above, the input unit includes the plurality of press-type switches, and a message to be output in response to pressing of each of the switches is stored in association with the switch. Thus, a message having a specific meaning can be surely output in accordance with the position of the pressed switch. In addition, a desired message can be output simply by pressing the press-type switch. Thus, a person can cause a desired message to be output by pressing the press-type switch with a part of their body, such as the elbow or the second joint of a bent finger, even when both hands are occupied, for example.

In addition, in the information storage method according to the present disclosure, the data server may store, for each of the pieces of identification information, information indicating an on-state.

In the configuration described above, information indicating an on-state is stored for each of the pieces of identification information that is associated with a corresponding stored message. Thus, an output status of each message, which changes in response to pressing of the corresponding press-type switch, can be correctly grasped.

In addition, in the information storage method according to the present disclosure, the data server may store, upon receipt of the on-signal, information indicating an on-state in association with the piece of identification information, and determine, upon receipt of the off-signal, whether information indicating an on-state is stored in association with the piece of identification information and deletes the information indicating an on-state in a case where the information indicating an on-state is stored.

In the configuration described above, upon receipt of the on-signal, the data server stores information indicating an on-state in association with the piece of identification information. Upon receipt of the off-signal, the data server deletes information indicating an on-state if the information indicating an on-state is stored in association with the piece of identification information. In this way, on/off control can be performed in terms of output of a desired message, simply by pressing a press-type switch.

In addition, in the information storage method according to the present disclosure, the system may further include a terminal unit connected to the data server to be able to perform data communication, and the terminal unit may display the message output from the data server.

In the configuration described above, the terminal unit is capable of displaying a message output from the data server. Thus, a desired message can be shared among a plurality of people.

In addition, in the information storage method according to the present disclosure, the terminal unit may accept input of a delete request to delete a displayed message, and transmit, to the data server, the message indicated by the delete request and a corresponding piece of identification information, and the data server may receive the message indicated by the delete request and the corresponding piece of identification information, and delete information indicating an on-state associated with the received piece of identification information.

In the configuration described above, the terminal unit is capable of accepting input of a delete request to delete a displayed message, and the data server is capable of deleting information indicating an on-state that is associated with the message. Thus, a message displayed on the terminal unit can be hidden upon the matter indicated by the message being completed.

In addition, in the information storage method according to the present disclosure, the input unit may be capable of detecting presence of a person, and the input unit may be supplied with electric power upon detecting presence of a person.

In the configuration described above, electric power is supplied to the input unit only in the case where the human presence sensor detects the presence of a human. Thus, the power consumption can be minimized.

In addition, in the information storage method according to the present disclosure, the data server may determine whether an on-signal and an off-signal for the same piece of identification information have been received a certain number of times or more in a certain period, determine, upon determining that the on-signal and the off-signal for the identical piece of identification information have been received the certain number of times or more, whether the number of times of the reception in the certain period is an odd number, and output, upon determining that the number of times of the reception in the certain period is an odd number, a message associated with the received piece of identification information together with an urgency flag.

In the configuration described above, it is determined whether an on-signal and an off-signal have been received together with the same piece of identification information a certain number of times or more in a certain period. If an on-signal and an off-signal have been received, it is determined whether the number of times of the reception in the certain period is an odd number. If it is determined that the number of times of the reception is an odd number, the message corresponding to the received piece of identification information is output together with an urgency flag. In this way, in the case where the same press-type switch is repeatedly pressed with a certain frequency or higher, the urgency flag which indicates an urgent matter can be attached. Thus, an action according to the urgency level can be prompted by changing the color or size used to display the message.

According to the configurations described above, the input unit includes the plurality of press-type switches, and a message to be output in response to pressing of each of the switches is stored in association with the switch. Thus, a message having a specific meaning can be surely output in accordance with the position of the pressed switch. In addition, a desired message can be output simply by pressing the press-type switch. Thus, a person can cause a desired message to be output by pressing the press-type switch with a part of their body, such as the elbow or the second joint of a bent finger, even when both hands are occupied, for example.

BRIEF DESCRIPTION OF THE SEVERAL VIEWS OF THE DRAWINGS

FIG. 7 is a diagram of an exemplary data structure of data stored in a message storage unit of the information storage system according to the first embodiment of the present disclosure.

DETAILED DESCRIPTION

Information storage systems according to embodiments of the present disclosure will be specifically described below with reference to the drawings.

First Embodiment

Figure 1:
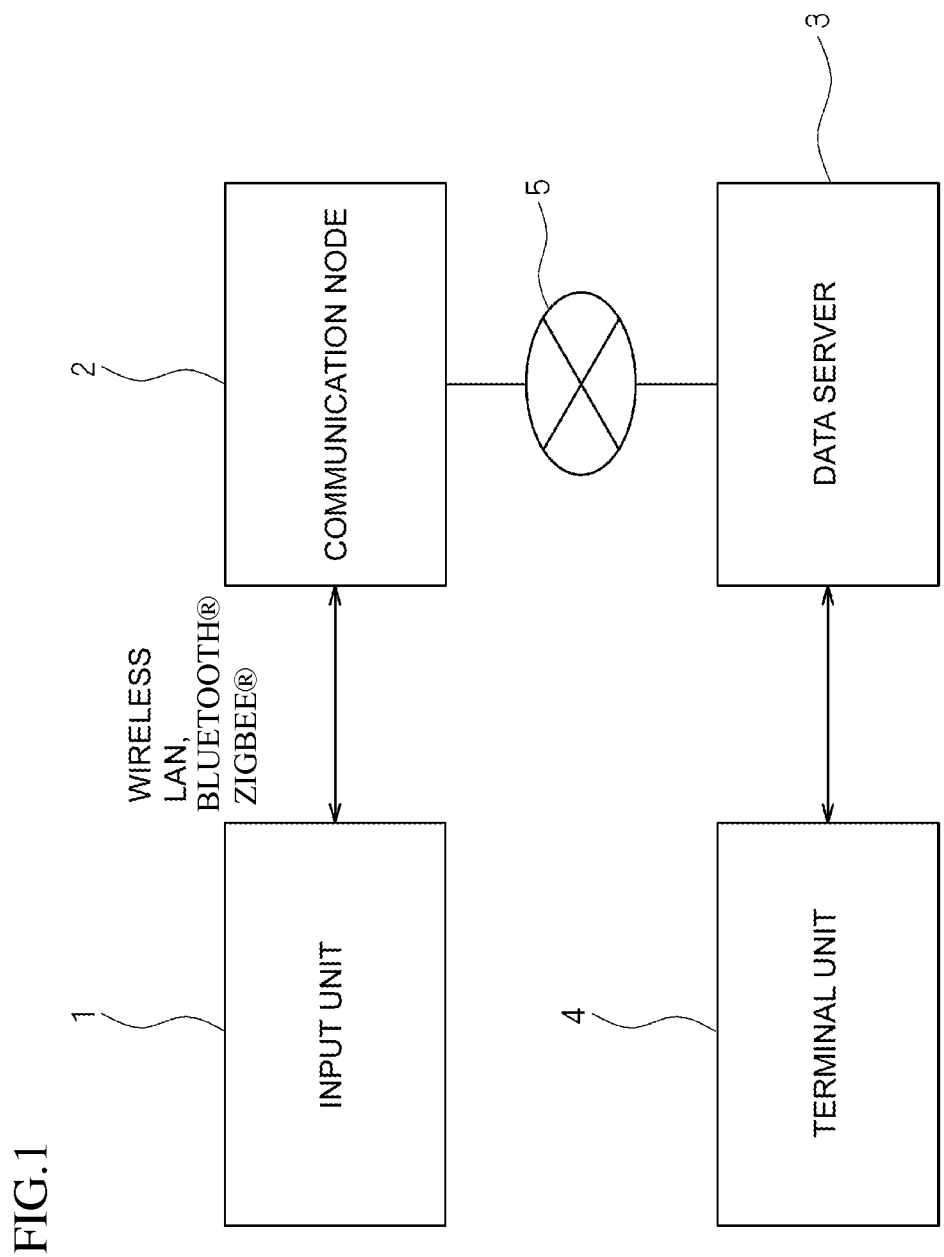
FIG. 1 is a block diagram illustrating a configuration of an information storage system according to a first embodiment of the present disclosure.

FIG. 1 is a block diagram illustrating a configuration of an information storage system according to a first embodiment of the present disclosure. As illustrated in FIG. 1, the information storage system according to the first embodiment includes an input unit 1, a data server 3, and a terminal unit 4. In the example illustrated in FIG. 1, a communication node 2 is provided so as to allow the input unit 1 and the data server 3 to surely perform data communication regardless of the installed location of the data server 3. The communication node 2 may be, for example, a gateway device or the like. The communication node 2 and the data server 3 are connected to each other via a given network 5, such as the Internet, to be able to perform data communication. The data server 3 may be a cloud server.

Figure 2:
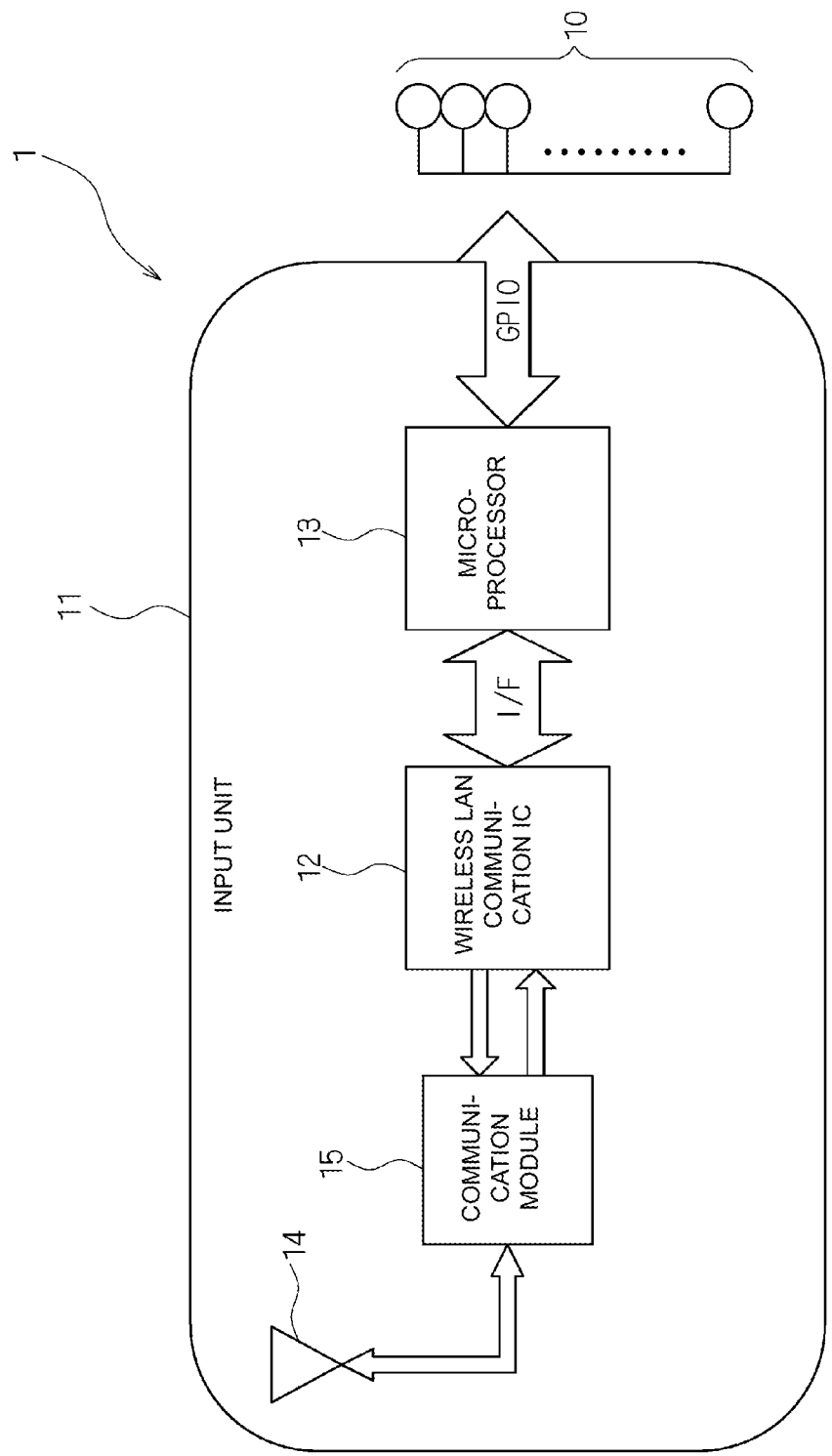
FIG. 2 is a block diagram illustrating a configuration of an input unit of the information storage system according to the first embodiment of the present disclosure.

The input unit 1 transmits an on-signal or an off-signal to the communication node 2 by using a communication scheme, such as wireless LAN, BLUETOOTH®, or ZIG-BEE®. FIG. 2 is a block diagram illustrating a configuration of the input unit 1 of the information storage system according to the first embodiment of the present disclosure.

As illustrated in FIG. 2, the input unit 1 of the information storage system according to the first embodiment includes a plurality of buttons 10. The plurality of buttons 10 are press-type switches each of which accepts input for an on-signal or an off-signal. The plurality of buttons 10 are connected to a microprocessor 13 via a GPIO (General Purpose Input Output) interface.

The microprocessor 13 receives an on-signal or an off-signal from each of the plurality of buttons 10 together with identification information unique to the button 10. The microprocessor 13 then transmits, to a wireless LAN communication IC 12, the on-signal or the off-signal, and the identification information that have been received from each of the plurality of buttons 10 in order to transmit them to outside via wireless LAN communication. The communication interface used between the microprocessor 13 and the wireless LAN communication IC 12 is not limited to a particular interface. For example, SDIO (Secure Digital Input Output) which is an SD standard used for input/output of SD cards, SPI (Serial Peripheral Interface) which is a communication standard used inside computers, USB (Universal Serial Bus), or the like can be used.

In FIG. 2, the wireless LAN communication IC 12 is provided independently from the microprocessor 13; however, they may be provided as an integrated module. In order to simplify the description, the entire module connected to the plurality of buttons 10 is hereinafter referred to as an input module 11 for convenience.

The wireless LAN communication IC 12 of the input module 11 is equipped with an antenna 14 for wireless LAN communication, with a communication module 15 interposed therebetween. The communication module 15 includes a single-band transmission/reception circuit of a transmission/reception band of 2.4 GHz. The received on-signal or off-signal, and identification information are transmitted from the antenna 14 to the communication node 2.

Figure 3:
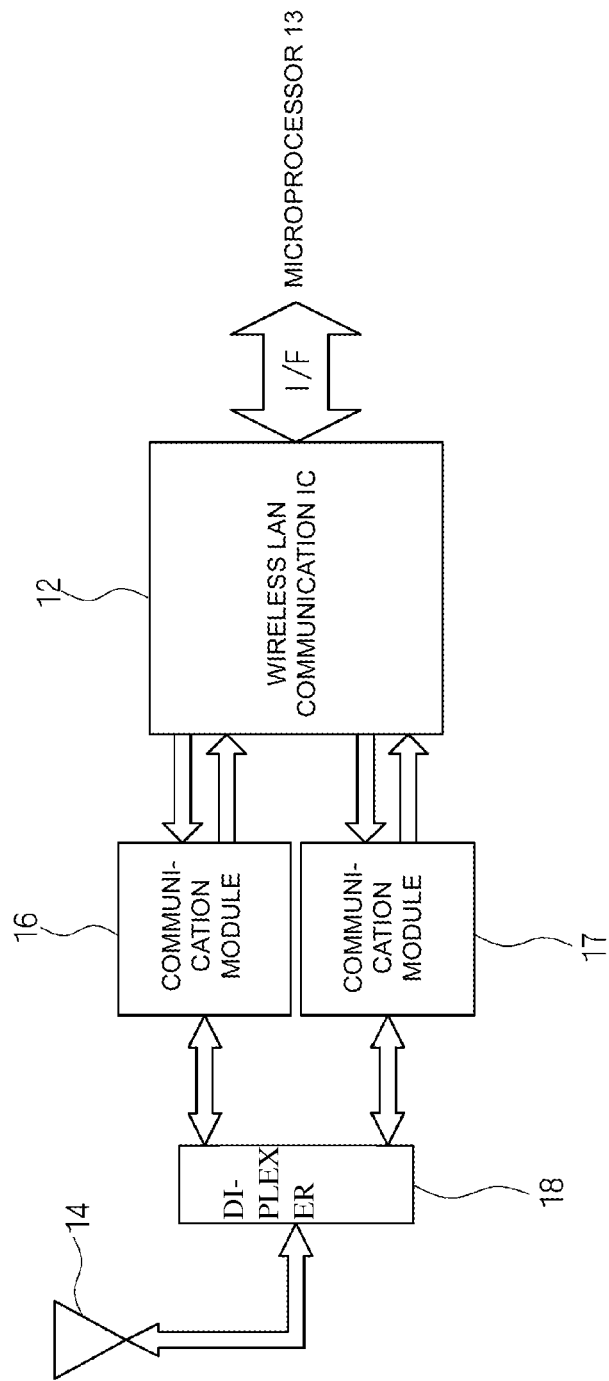
FIG. 3 is a partial block diagram illustrating a configuration of a communication unit of the input unit of the information storage system according to the first embodiment of the present disclosure in the case of a dual band configuration.

Obviously, the configuration is not limited to the use of a communication module including a single-band transmission/reception circuit for wireless LAN communication, and a communication module including a dual-band transmission/reception circuit may be used in order to increase the communication speed. FIG. 3 is a partial block diagram illustrating a configuration of a communication unit of the input unit 1 of the information storage system according to the first embodiment of the present disclosure in the case of a dual-band configuration.

As illustrated in FIG. 3, in the case of the communication module including a dual-band transmission/reception circuit, the wireless LAN communication IC 12 of the input module 11 is equipped with the antenna 14 for data communication, with communication modules 16 and 17 each including a transmission/reception circuit for the corresponding transmission/reception band interposed therebetween, to allow the use of a transmission/reception band of 5 GHz as well as a transmission/reception band of 2.4 GHz. A diplexer (demultiplexer) 18 is disposed between the antenna 14 and the communication modules 16 and 17 each including a transmission/reception circuit.

Figure 4:
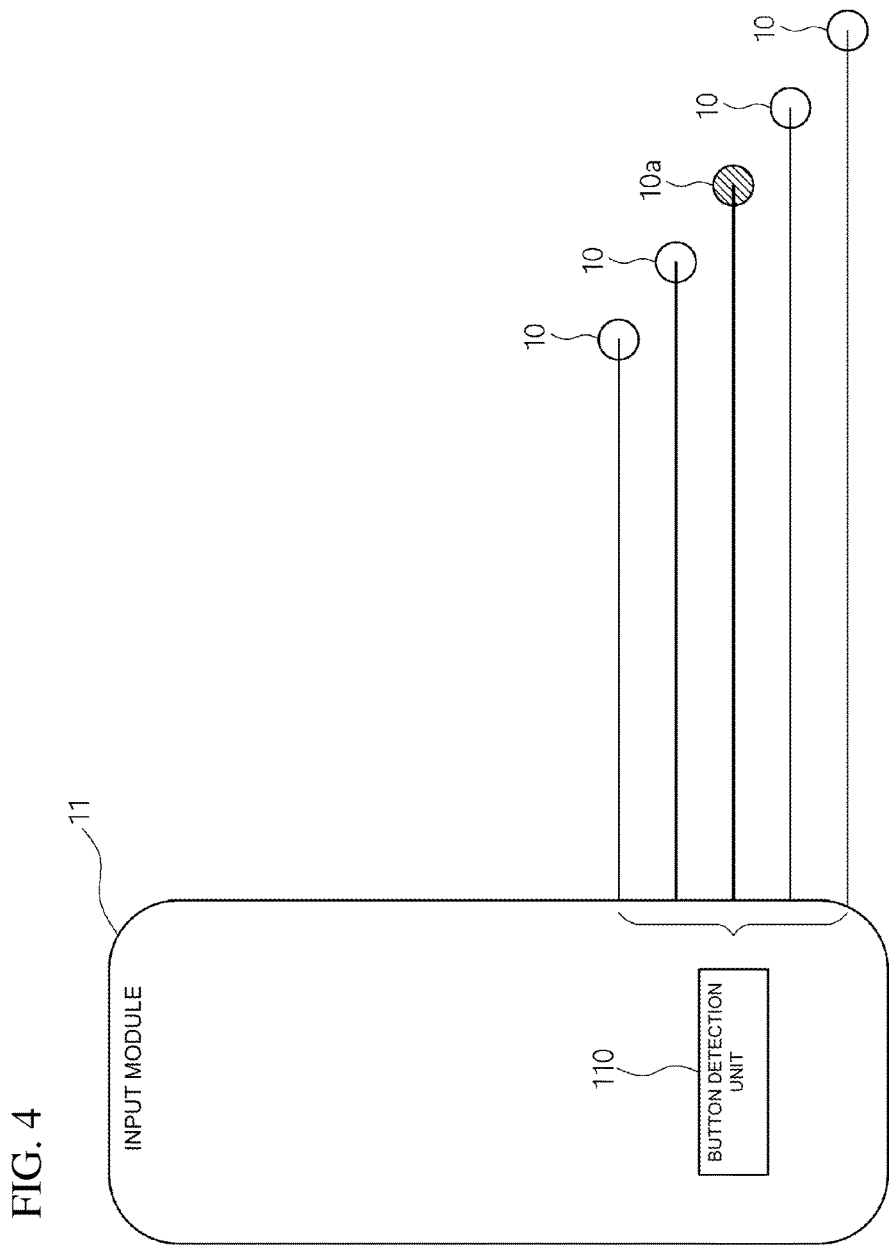
FIG. 4 is a diagram of an exemplary input detection method in the case where buttons of the input unit of the information storage system according to the first embodiment of the present disclosure are arranged in a line.

In addition, an arrangement and an input detection method of the buttons 10 of the input unit 1 are not limited to particular configurations. The input unit 1 just needs to include as many separate buttons 10 as the number of kinds of information which is not so important to be written down in detail in a daily life but comes in handy if stored. FIG. 4 is a diagram of an exemplary input detection method in the case where the buttons 10 of the input unit 1 of the information storage system according to the first embodiment of the present disclosure are arranged in a line.

In the example of FIG. 4, each of the buttons 10 is configured to touch a ground electrode when it is pressed. For example, in the case where a button 10*a* is pressed among the buttons 10 arranged in a line, an output voltage level of the GPIO interface connected to the button 10*a* becomes LOW. A button detection unit 110 of the input module 11 is capable of identifying the pressed button 10*a* by detecting the button 10 for which the output voltage level has become LOW.

Figure 5:
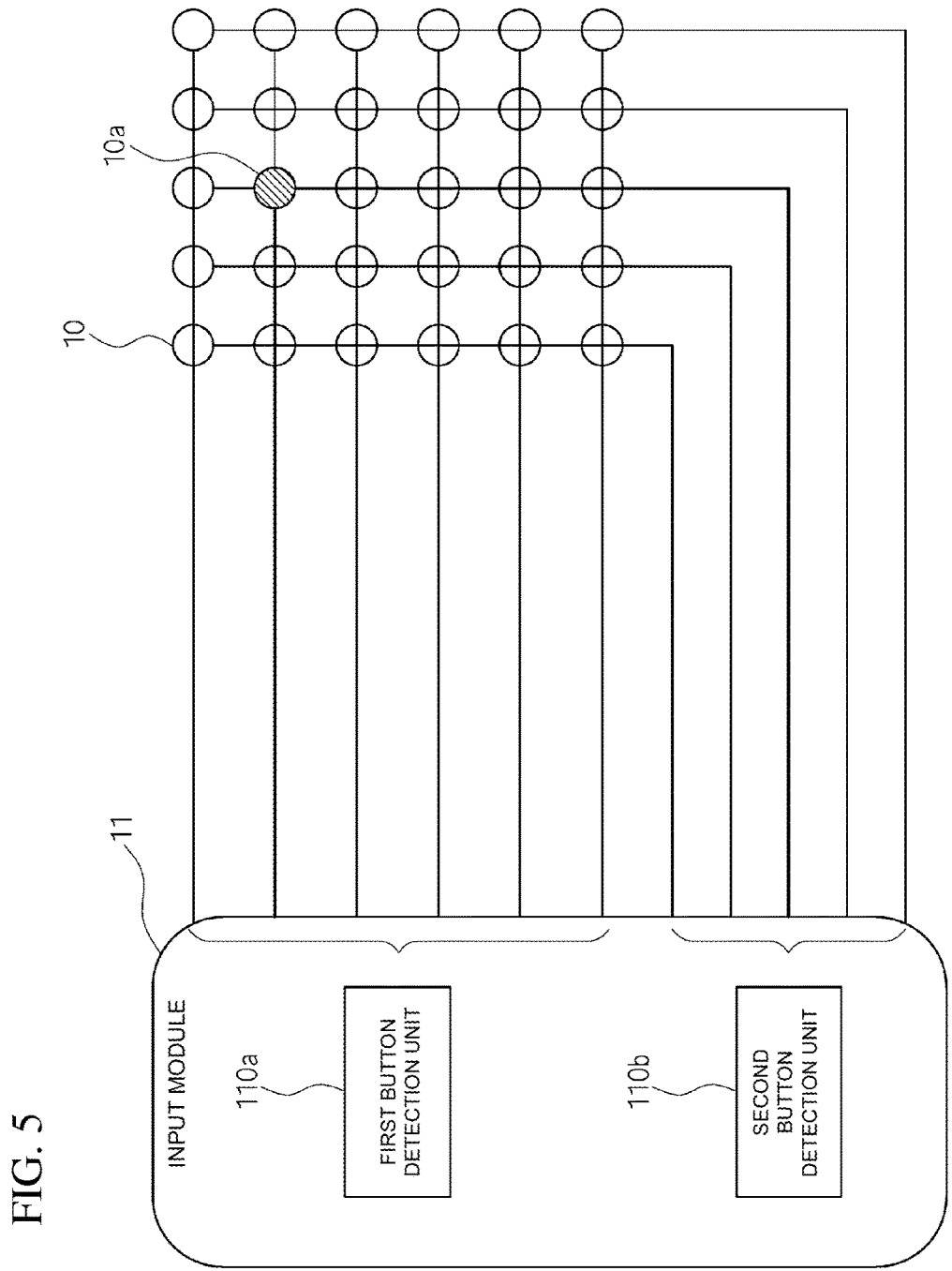
FIG. 5 is a diagram of an exemplary input detection method in the case where buttons of the input unit of the information storage system according to the first embodiment of the present disclosure are vertically and horizontally arranged in a matrix.

In addition, FIG. 5 is a diagram of an exemplary input detection method in the case where the buttons 10 of the input unit 1 of the information storage system according to the first embodiment of the present disclosure are vertically and horizontally arranged in a matrix. Also in the example of FIG. 5, each of the buttons 10 is configured to touch a ground electrode when it is pressed. For example, in the case where the button 10*a* is pressed among the plurality of buttons 10 arranged in a matrix, an output voltage level of the row GPIO interface connected to the button 10*a* and an output voltage level of the column GPIO interface connected to the button 10*a* become LOW.

A first button detection unit 110*a* of the input module 11 detects the row for which the output voltage level has become LOW, and a second button detection unit 110*b* detects the column for which the output voltage level has become LOW. Thus, it can be identified that the button 10*a* has been pressed. In this way, which button 10 has been pressed is identified from among the plurality of buttons 10 vertically and horizontally arranged in a matrix.

Figure 6:
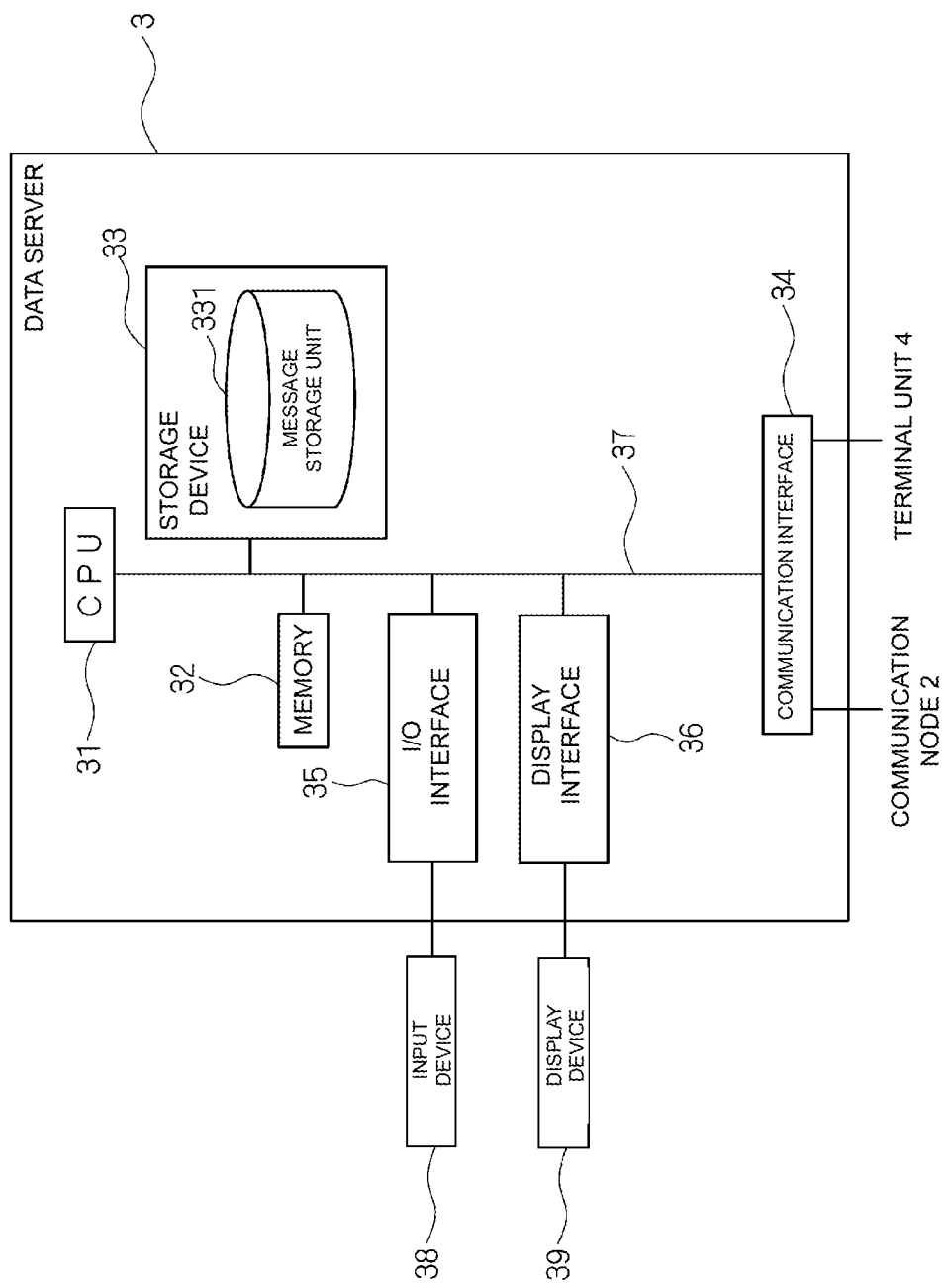
FIG. 6 is a block diagram illustrating an example of a configuration of a data server of the information storage system according to the first embodiment of the present disclosure.

FIG. 6 is a block diagram illustrating an example of a configuration of the data server 3 of the information storage system according to the first embodiment of the present disclosure. As illustrated in FIG. 6, the data server 3 according to the first embodiment of the present disclosure at least includes a CPU (central processing unit) 31, a memory 32, a storage device 33, a communication interface 34, an I/O interface 35, a display interface 36, and an internal bus 37 that connects the above-described hardware components to one another.

The CPU 31 is connected to the above-described hardware components of the data server 3 via the internal bus 37, controls operations of the above-described hardware components, and carries out various software-based functions in accordance with a computer program stored in the storage device 33. The memory 32 is constituted by a volatile memory, such as an SRAM (Static Random Access Memory) or an SDRAM (Synchronous Dynamic Random Access Memory). A load module is loaded into the memory 32 when a computer program is executed, and temporary data or the like generated during execution of the computer program is stored in the memory 32.

The storage device 33 is constituted by a built-in fixed storage device (hard disk), a ROM (Read Only Memory), or the like. A computer program stored in the storage device 33 is obtained by downloading it from a portable recording medium, such as a DVD or a CD-ROM, having information such as programs and data stored thereon or from an external computer via the communication interface 34. At the time of execution, such a computer program is loaded from the storage device 33 into the memory 32 and is executed.

In addition, the storage device 33 includes a message storage unit 331. The message storage unit 331 stores messages each of which is to be output to the terminal unit 4 in response to a received on-signal based on the pressed button 10. FIG. 7 is a diagram of an exemplary data structure of data stored in the message storage unit 331 of the information storage system according to the first embodiment of the present disclosure.

As illustrated in FIG. 7, a button ID is assigned as unique identification information to each of the plurality of buttons 10 included in the input unit 1, and the message storage unit 331 stores, for each button ID, a message to be output.

In addition, an on-flag which is information indicating an on-state is stored for each button ID. In the case where the data server 3 receives an on-signal in response to pressing of the button 10, the data server 3 sets the on-flag associated with the corresponding button ID to '1'. Conversely, in the case where the data server 3 receives an off-signal in response to pressing of the button 10, the data server 3 sets the on-flag associated with the corresponding button ID to '0'. A message for which the on-flag is set to '1' is extracted and output to the terminal unit 4.

Referring back to FIG. 6, the communication interface 34 is connected to the internal bus 37. The communication interface 34 is capable of exchanging data with an external computer or the like as a result of being connected to the external network 5, such as the Internet, a LAN, or a WAN. In addition, the communication interface 34 is connected to the communication node 2 and one or a plurality of terminal units 4 via the network 5.

The I/O interface 35 is connected to an input device 38, such as a keyboard or a mouse, and accepts input of data. In the case where the data server 3 is installed at a place where the user can operate the data server 3, the data server 3 may directly accept input of a message to be stored in the message storage unit 331. In addition, the display interface 36 is connected to a display device 39, such as a CRT monitor or an LCD. The display interface 36 allows data stored in the message storage unit 331 to be checked.

Referring back to FIG. 1, the data server 3 is connected to one or a plurality of terminal units 4 to be able to perform data communication. The terminal unit 4 is not limited to a particular type, and any computer that at least includes an input device capable of accepting input of a message and a display device capable of displaying a message can be used. The terminal unit 4 may be mobile and portable. For example, the terminal unit 4 may be a smartphone or a tablet terminal.

Figure 8:
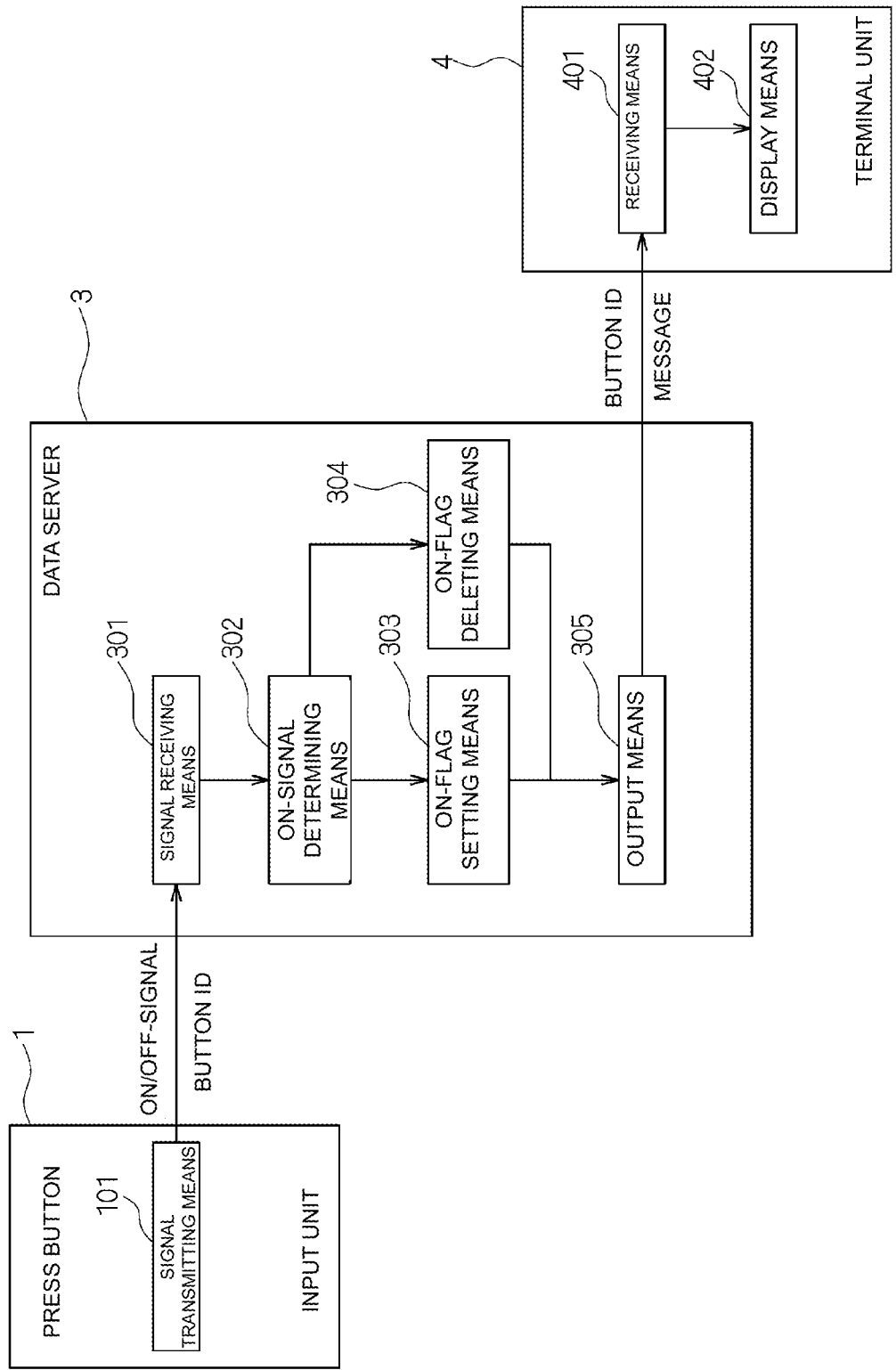
FIG. 8 is a functional block diagram of the information storage system according to the first embodiment of the present disclosure.

FIG. 8 is a functional block diagram of the information storage system according to the first embodiment of the present disclosure. As illustrated in FIG. 8, a signal transmitting means 101 of the input unit 1 transmits, to the data server 3, an on-signal or an off-signal, and a button ID which is the identification information. Note that a description of the communication node 2 is omitted below because the communication node 2 just relays data transmitted and received.

A signal receiving means 301 of the data server 3 receives the on-signal or the off-signal, and the button ID that have been transmitted from the input unit 1. An on-signal determining means 302 determines whether the received signal is an on-signal.

If the on-signal determining means 302 determines that the received signal is an on-signal, an on-flag setting means 303 sets the on-flag which is information indicating an on-state to '1' and stores the on-flag in the message storage unit 331. If the on-signal determining means 302 determines that the received signal is an off-signal, an on-flag deleting means 304 deletes the on-flag which is information indicating an on-state and which is stored in the message storage unit 331. Specifically, the on-flag deleting means 304 sets the on-flag to '0' and store the on-flag.

An output means 305 extracts a message associated with the on-flag of '1' and transmits the extracted message to the terminal unit 4 together with the corresponding button ID. A receiving means 401 of the terminal unit 4 receives the message and the button ID that have been transmitted from the data server 3. A display means 402 displays the received message.

Figure 9:
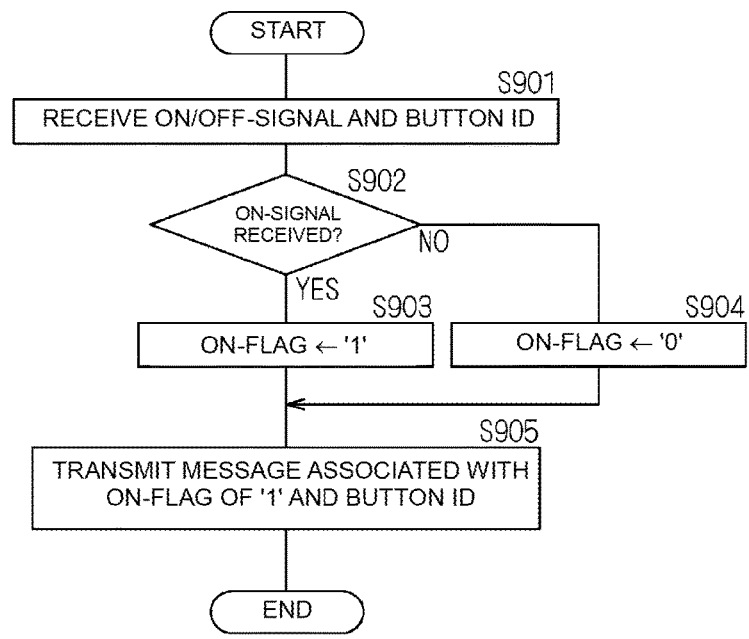
FIG. 9 is a flowchart illustrating a procedure of a process performed by a CPU of the data server of the information storage system according to the first embodiment of the present disclosure.

FIG. 9 is a flowchart illustrating a procedure of a process performed by the CPU 31 of the data server 3 of the information storage system according to the first embodiment of the present disclosure. As illustrated in FIG. 9, the CPU 31 of the data server 3 receives an on-signal or an off-signal, and a button ID that have been transmitted from the input unit 1 (step S901) and determines whether the received signal is an on-signal (step S902).

If the CPU 31 determines that the received signal is an on-signal (step S902: YES), the CPU 31 sets a corresponding on-flag which is information indicating an on-state to '1' and stores the on-flag in the message storage unit 331 (step S903). If the CPU 31 determines that the received signal is an off-signal (step S902: NO), the CPU 31 sets a corresponding on-flag to '0' and stores the on-flag in the message storage unit 331 (step S904).

The CPU 31 transmits a message associated with the on-flag of '1' to the terminal unit 4 together with the corresponding button ID (step S905).

As described above, in accordance with the first embodiment, the input unit 1 includes the plurality of press-type buttons (switches) 10, and a message to be output in response to pressing of each of the buttons 10 is stored in the data server 3 in association with the button 10. Thus, a message having a specific meaning can be surely output in accordance with the position of the pressed button 10. In addition, the buttons 10 are press-type buttons, and a desired message can be output simply by pressing each of the buttons 10. Thus, a person can cause a desired message to be output by pressing the button 10 with a part of their body, such as the elbow or the second joint of a bent finger, even when their both hands are occupied, for example.

In the case where the first embodiment is used as a home information storage system, the communication node 2 is installed in a home and is connected to the external data server 3 to be able to perform data communication. The input unit 1 is, for example, an input unit including the plurality of buttons 10 arranged in a line. The input unit 1 is fixed on the front face of a refrigerator, on the wall of the bathroom or the washroom, or the like by using magnet, double-side adhesive tape, or the like. A single input unit 1 may be installed, or a plurality of input units 1 may be installed at suitable places.

Messages such as "Milk", "Soy Source", and "Sugar" may be assigned to the respective buttons 10. When the need to buy one of these things arises, the user presses the corresponding button 10. Consequently, the message corresponding to the pressed button 10 is displayed on the terminal unit 4. The messages can be registered using the terminal unit 4.

The terminal units 4 on which the message is displayed can be limited by using the MAC address or the IP address. By limiting the terminal units 4 on which the message is displayed to the terminal units 4, for example, smartphones and tablet terminals owned by family members, brief information that is not so important to be input as text data can be stored, displayed, and shared in place of a memo. If "Milk" is displayed on the terminal units 4, each family member can understand that "Milk" is a message indicating that "they ran out of milk", that is, "they need to buy milk".

Second Embodiment

A configuration of an information storage system according to a second embodiment of the present disclosure is similar to that of the first embodiment. Thus, the same reference signs are used to omit a detailed description thereof. The second embodiment differs from the first embodiment in that a configuration can be set to stop displaying a message that is being displayed on the terminal unit 4.

Figure 10:
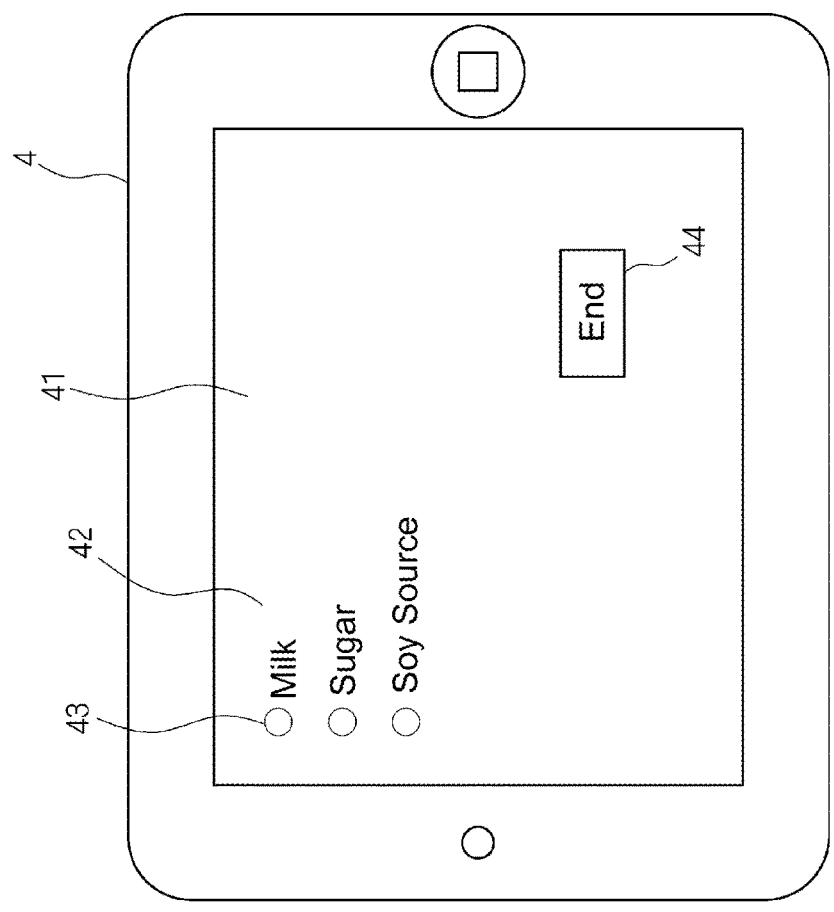
FIG. 10 is a diagram of an exemplary window displayed on a terminal unit of the information storage system according to a second embodiment of the present disclosure.

FIG. 10 is a diagram of an exemplary window displayed on the terminal unit 4 of the information storage system according to the second embodiment of the present disclosure. A tablet terminal is used as the terminal unit 4 in FIG. 10. Obviously, the terminal unit 4 is not limited to the tablet terminal, and the type of the terminal does not matter as long as the similar operations can be performed.

As illustrated in FIG. 10, messages 42 selected by pressing of the buttons 10 of the input unit 1 are displayed on a display unit 41. Selection tags 43 are displayed for the respective messages. If selection of an end button 44 is accepted after selection of the selection tag 43 has been accepted, a delete request to delete the message for which selection of the selection tag 43 has been accepted is transmitted to the data server 3.

Figure 11:
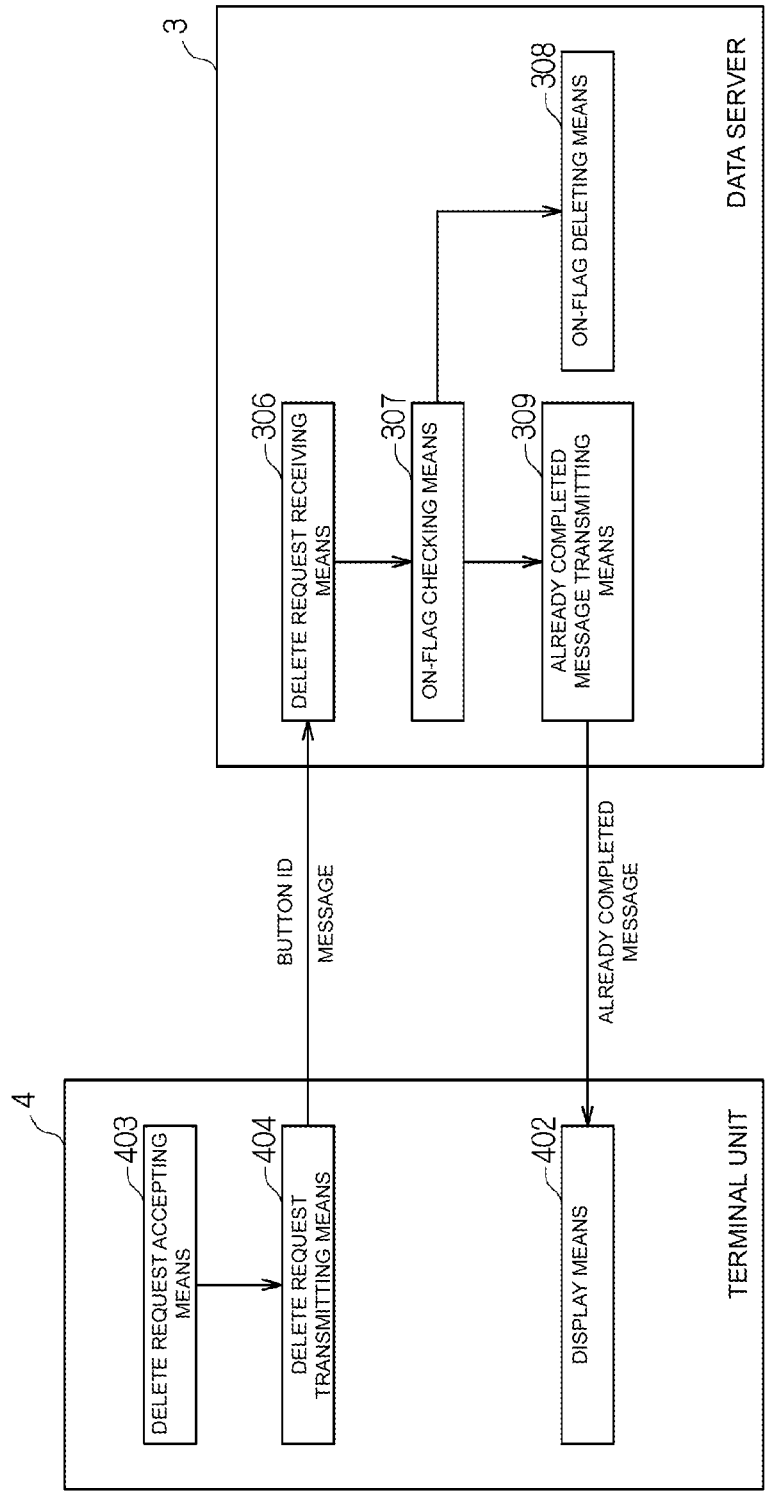
FIG. 11 is a functional block diagram of the information storage system according to the second embodiment of the present disclosure.

FIG. 11 is a functional block diagram of the information storage system according to the second embodiment of the present disclosure. A delete request accepting means 403 of the terminal unit 4 accepts selection of a message to be deleted from among the displayed messages. A delete request transmitting means 404 transmits, as a delete request, the message that has been selected and the button ID associated with the message.

A delete request receiving means 306 of the data server 3 receives the message requested to be deleted and the button ID. An on-flag checking means 307 checks whether the on-flag associated with the received button ID is '1' or '0'. If the on-flag associated with the received button ID is '1', an on-flag deleting means 308 sets the on-flag to '0' and stores the on-flag. Consequently, the message requested to be deleted is removed from the terminal units 4. Note that when the message requested to be deleted is removed from the terminal units 4, the data server 3 may transmit a deletion message to each terminal unit 4 that has displayed the deleted message to cause the terminal unit 4 to display the deletion message. The deletion message may be, for example, "Milk has been deleted by XX." In this way, people carrying the other terminal units 4 can confirm that XX bought milk.

If the on-flag associated with the received button ID is '0', an already completed message transmitting means 309 determines that a setting for stopping displayed has already set for the message by a person carrying the other terminal unit 4 and transmits an already completed message, such as "The message has already been deleted by another person", to the terminal unit 4. The display means 402 of the terminal unit 4 displays the received already completed message.

Figure 12:
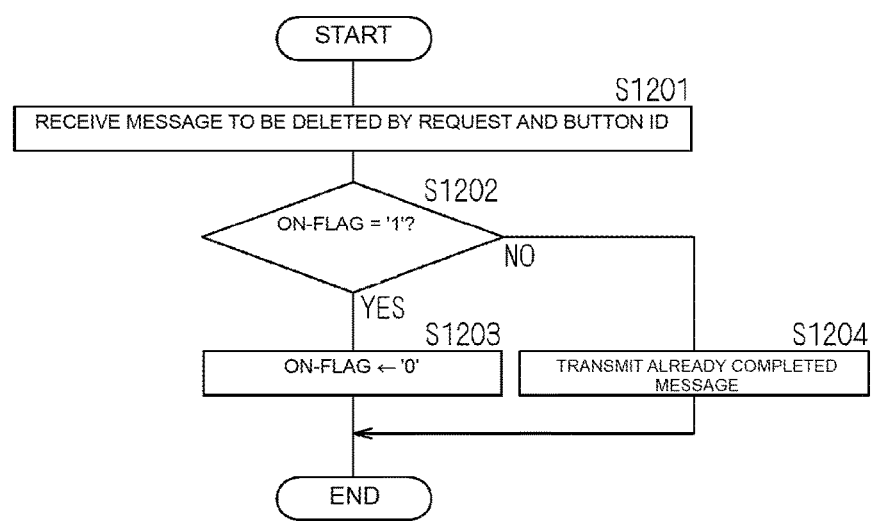
FIG. 12 is a flowchart illustrating a procedure of a process performed by the CPU of the data server of the information storage system according to the second embodiment of the present disclosure.

FIG. 12 is a flowchart illustrating a procedure of a process performed by the CPU 31 of the data server 3 of the information storage system according to the second embodiment of the present disclosure. As illustrated in FIG. 12, the CPU 31 of the data server 3 receives, as a delete request, a message requested to be deleted and a corresponding button ID (step S1201) and determines whether the on-flag associated with the received button ID is '1' (step S1202). If the CPU 31 determines that the on-flag associated with the received button ID is '1' (step S1202: YES), the CPU 31 sets the on-flag to '0' and stores the on-flag (step S1203). In this way, the corresponding message is removed from the terminal unit 4.

If the CPU 31 determines that the on-flag associated with the received button ID is '0' (step S1202: NO), the CPU 31 determines that a setting for stopping displaying has already set for the message by a person carrying the other terminal unit 4 and transmits an already completed message to the terminal unit 4 (step S1204).

As described above, in accordance with the second embodiment, the terminal unit 4 is capable of accepting input of a delete request to delete a displayed message, and the data server 3 is capable of deleting the corresponding on-flag which is information indicating an on-state associated with the message. Thus, the displayed message can be deleted from the terminal units 4 upon the matter indicated by the message being completed.

Third Embodiment

A configuration of an information storage system according to a third embodiment of the present disclosure is similar to those of the first and second embodiments. Thus, the same reference signs are used to omit a detailed description thereof. The third embodiment differs from the first embodiment in that an urgency flag can be attached when the same button 10 of the input unit 1 is pressed repeatedly.

Figure 13:
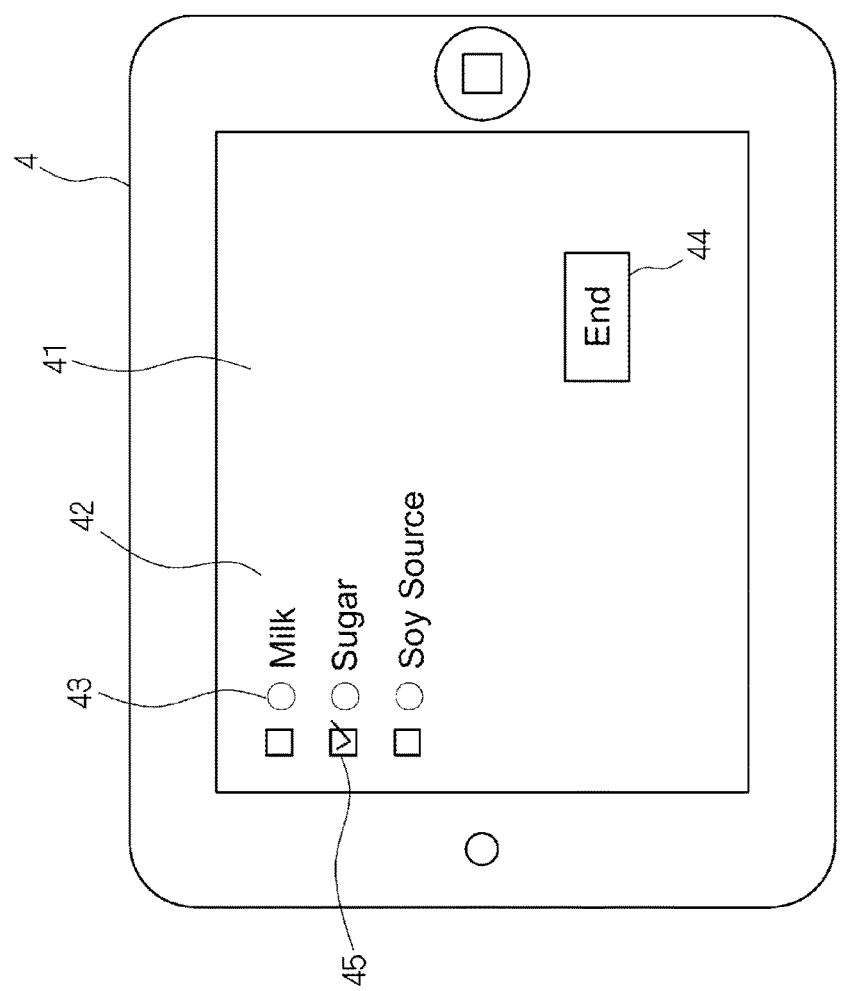
FIG. 13 is a diagram of an exemplary window displayed on the terminal unit of the information storage system according to a third embodiment of the present disclosure.

FIG. 13 is a diagram of an exemplary window displayed on the terminal unit 4 of the information storage system according to the third embodiment of the present disclosure. A tablet terminal is used as the terminal unit 4 also in FIG. 13. The terminal unit 4 is not limited to the tablet terminal. Thus, the type of the terminal does not matter as long as the similar operations can be performed.

As illustrated in FIG. 13, the messages 42 selected by pressing the buttons 10 of the input unit 1 are displayed. The selection tags 43 are displayed for the respective messages. Urgency tags 45 are additionally displayed next to the corresponding selection tags 43. In the case of detecting that the same button 10 has been pressed repeatedly, the urgency flag can be attached. For example, a "check" mark is displayed at the urgency tag 45. The urgency tag 45 allows people to recognize that the matter indicated by the message needs to be processed immediately. In the example of FIG. 13, people can understand that there is a need to buy sugar immediately, and it is expected that an email saying "Shall I buy sugar?" is received from a family member who is currently out of the home.

Figure 14:
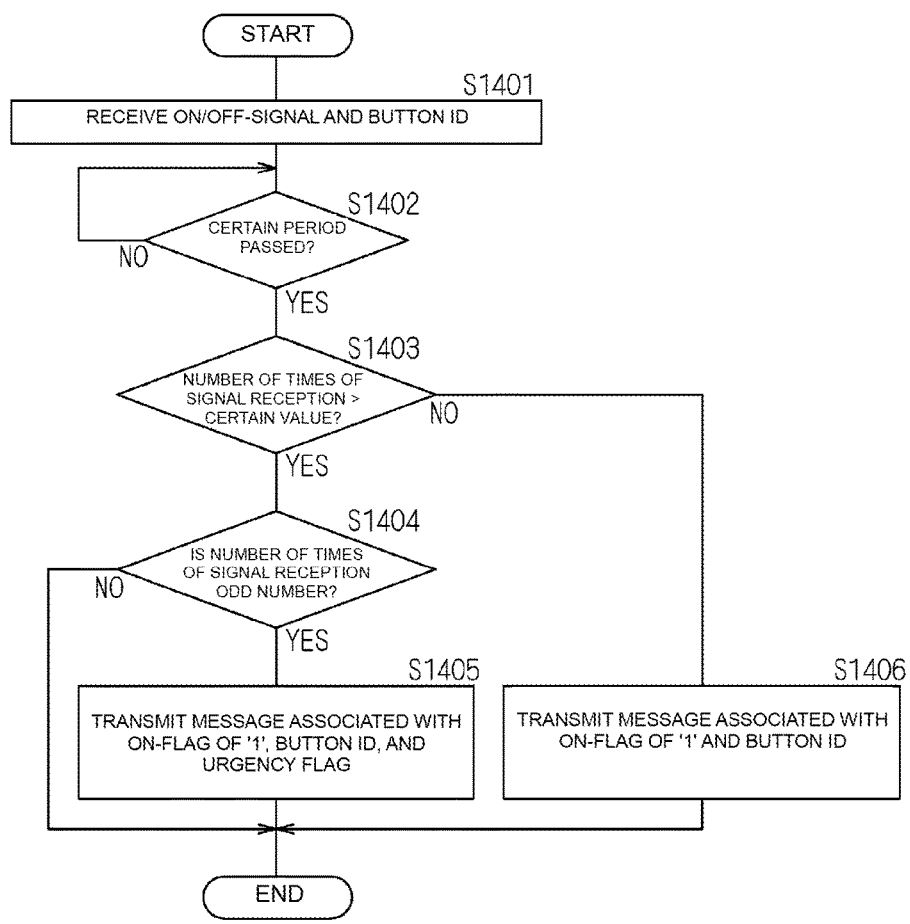
FIG. 14 is a flowchart illustrating a procedure of a process performed by the CPU of the data server of the information storage system according to the third embodiment of the present disclosure.

FIG. 14 is a flowchart illustrating a procedure of a process performed by the CPU 31 of the data server 3 of the information storage system according to the third embodiment of the present disclosure. As illustrated in FIG. 14, the CPU 31 of the data server 3 receives an on-signal or an off-signal, and a button ID that have been transmitted from the input unit 1 (step S1401) and determines whether a certain period has passed from the initial reception (step S1402). If the CPU 31 determines that the certain period has not passed (step S1402: NO), the CPU 31 enters a waiting state.

If the CPU 31 determines that the certain period has passed (step S1402: YES), the CPU 31 determines whether the number of times the on-signal and the off-signal for the same button ID have been received in the certain period is larger than a certain value (step S1403). If the CPU 31 determines that the number of times of the reception is larger than the certain value (step S1403: YES), the CPU 31 determines whether the number of times of the reception in the certain period is an odd number (step S1404). If the CPU 31 determines that the number of times of the reception in the certain period is an odd number, the received signal can be determined as an off-signal for changing the on-flag to the off-state if the state before the reception is the on-state or as an on-signal for changing the on-flag to the on-state if the state before the reception is the off-state.

For example, in the case where the state before the reception is the off-state and the CPU 31 determines that the number of times of the reception is an odd number (step S1404: YES), the CPU 31 extracts a message associated with the on-flag of '1' and transmits the message to the terminal unit 4 together with the corresponding button ID and the urgency flag (step S1405). If the CPU 31 determines that the number of times of the reception is an even number (step S1404: NO), the CPU 31 determines that a wrong operation has been performed and ends the process. Note that it is determined whether the number of times the same button 10 has been pressed repeatedly is an odd number or an even number based on a light indication by an LED or the like corresponding to the button 10. Suppose that the LED is configured to turn on in the on-state and to turn off in the off-state, for example. In such a case, it can be determined that the number of times the same button 10 has been pressed repeatedly is an odd number when pressing the button 10 is stopped in a state where the LED is turned off if the LED is on before the start of pressing.

If the CPU 31 determines that the number of times of the reception is less than or equal to the certain value (step S1403: NO), the CPU 31 extracts a message associated with the on-flag of '1' and transmits the extracted message to the terminal unit 4 together with the corresponding button ID (step S1406).

As described above, in accordance with the third embodiment, it is determined whether an on-signal and an off-signal have been received together with the same piece of identification information a certain number of times or more in a certain period. If an on-signal and an off-signal have been received the certain number of times or more, it is determined whether the number of times of the reception in the certain period is an odd number. If it is determined that the number of times of the reception is an odd number, the message corresponding to the received piece of identification information is output together with an urgency flag. In this way, in the case where the same push button (switch) 10 is repeatedly pressed with a certain frequency or higher, the urgency flag which indicates an urgent manner can be attached. Thus, an action according to the urgency level can be prompted by changing the color or size used to display the message.

In the case where the third embodiment is used as a home information storage system, the message storage unit 331 may store the urgency flag in association with each button ID. For example, in the case where the urgency flag of '1' is stored, the color or size used for displaying the corresponding message on the terminal unit 4 can be changed or a "check" mark can be displayed at the urgency tag 45 as illustrated in FIG. 13.

Fourth Embodiment

A configuration of an information storage system according to a fourth embodiment of the present disclosure is similar to those of the first to third embodiments. Thus, the same reference signs are used to omit a detailed description thereof. The fourth embodiment differs from the first to third embodiments in that the input unit 1 includes a human presence sensor and is configured to save energy because it is supplied with electric power upon detection of the presence of a person.

Figure 15:
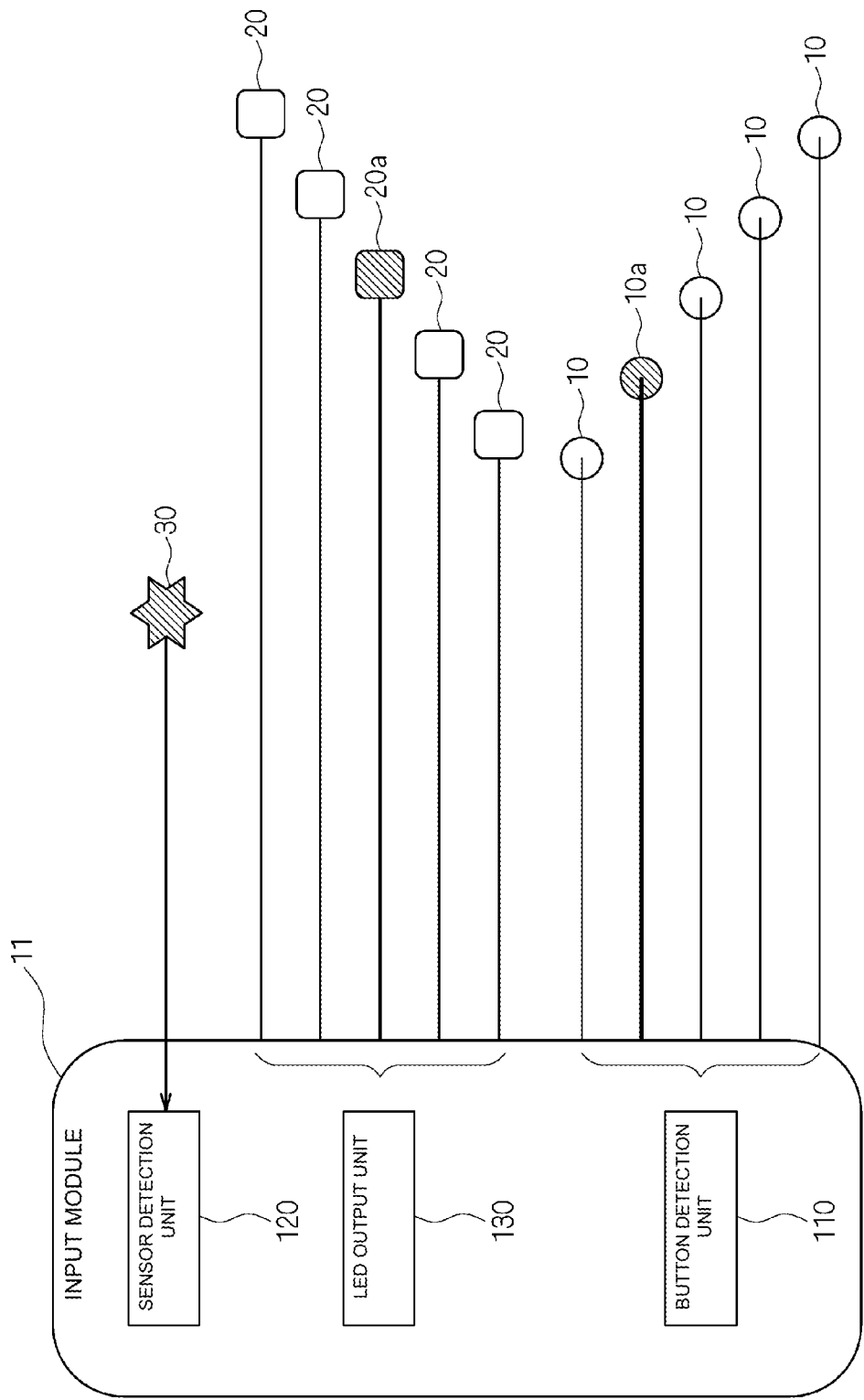
FIG. 15 is a diagram of an exemplary input detection method in the case where the input unit of the information storage system according to a fourth embodiment of the present disclosure includes a human presence sensor.

FIG. 15 is a diagram of an exemplary input detection method in the case where the input unit 1 of the information storage system according to the fourth embodiment of the present disclosure includes a human presence sensor. In the example of FIG. 15, an infrared sensor is used as a human presence sensor 30, and the input unit 1 is supplied with electric power from a power source upon the human presence sensor 30 detecting the presence of a person. Note that the human presence sensor 30 used is not limited to the infrared sensor, and an ultrasonic sensor, a visible light sensor, or the like may be used.

Referring to FIG. 15, upon a sensor detection unit 120 detecting that the human presence sensor 30 has detected the presence of a person, the input module 11 is supplied with electric power, causing the button detection unit 110 and an LED output unit 130 to operate. When the button 10 is pressed, the button 10 touches a ground electrode. For example, in the case where the button 10a is pressed among the buttons 10 arranged in a line, an output voltage level of the GPIO interface connected to the button 10a becomes LOW.

The button detection unit 110 of the input module 11 is capable of identifying that the button 10a has been pressed by detecting the button 10a for which the output voltage level has become LOW. The LED output unit 130 turns on an LED 20a corresponding to the identified button 10a from among a plurality of LEDs 20. In this way, which button 10 has been pressed can be visually recognized.

As described above, in accordance with the fourth embodiment, the input unit 1 is powered on in the case where the human presence sensor 30 detects the presence of a person. Thus, the power consumption can be minimized.

It is needless to say that the above-described embodiments can be altered within a range not departing from the gist of the present disclosure. For example, the communication node 2 can be used to relay data, or the data server 3 may be installed in a home. In addition, the press-type switches are not limited to so-called push-button-type switches but refer to a broad concept including a pressure-sensitive touchscreen, for example.

REFERENCE SIGNS LIST 1 input unit
2 communication node
3 data server
4 terminal unit
10, 10a button (switch)
11 input module
12 wireless LAN communication IC
13 microprocessor
20, 20a LED 30 human presence sensor
31 CPU
32 memory
33 storage device
34 communication interface
35 I/O interface
36 display interface
37 internal bus

The invention claimed is:

1. An information storage system comprising:
an input unit including a plurality of press switches each of which accepts input for an on-signal or an off-signal; and
a data server that:
stores pieces of identification information, each identifying one of the switches, and a corresponding message,
outputs the corresponding message in response to the input accepted by each of the switches,
extracts a message associated with the piece of the identification information received together with the on-signal,
determines whether an on-signal and an off-signal for a same piece of the identification information have been received a certain number of times or more in a certain period,
determines whether the on-signal and the off-signal for the same piece of the identification information have been received the certain number of times or more, and whether the number of times of the reception in the certain period is an odd number or an even number,
upon determining that the number of times of the reception in the certain period is an odd number, outputs the message associated with the received piece of the identification information together with an urgency flag, and
upon determining that the number of times of the reception in the certain period is an even number, does not perform any further action with regard to the received on-signal or off-signal,
the input unit and the data server being connected to each other to be able to perform data communication,
the input unit including:
a signal transmitter for transmitting the on-signal or the off-signal and the pieces of the identification information to the data server, and
the data server including:
a signal receiver for receiving the on-signal or the off-signal and the pieces of the identification information, and
an output unit for extracting and outputting the message associated with the piece of the identification information received together with the on-signal.

2. The information storage system according to claim 1, wherein the data server stores, for each of the pieces of identification information, information indicating an on-state.

3. The information storage system according to claim 2, wherein the data server
stores, upon receipt of the on-signal, information indicating an on-state in association with the piece of the identification information, and
determines, upon receipt of the off-signal, whether information indicating an on-state is stored in association with the piece of the identification information and deletes the information indicating an on-state in a case where the information indicating an on-state is stored.

4. The information storage system according to claim 2, further comprising:
a terminal unit connected to the data server to be able to perform data communication,
the terminal unit including a display for displaying the message output from the data server.

5. The information storage system according to claim 2, wherein the terminal unit includes:
a delete request acceptor for accepting input of a delete request to delete a displayed message, and
a delete request transmitter for transmitting, to the data server, the message subject to the delete request and a corresponding piece of the identification information, and
wherein the data server includes:
a delete request receiver for receiving the message subject to the delete request and the corresponding piece of the identification information, and
a deleting unit for deleting information indicating an on-state associated with the received piece of the identification information.

6. The information storage system according to claim 1, wherein the data server
stores, upon receipt of the on-signal, information indicating an on-state in association with the piece of the identification information, and
determines, upon receipt of the off-signal, whether information indicating an on-state is stored in association with the piece of the identification information and deletes the information indicating an on-state in a case where the information indicating an on-state is stored.

7. The information storage system according to claim 6, further comprising:
a terminal unit connected to the data server to be able to perform data communication,
the terminal unit including a display for displaying the message output from the data server.

8. The information storage system according to claim 6, wherein the terminal unit includes:
a delete request acceptor for accepting input of a delete request to delete a displayed message, and
a delete request transmitter for transmitting, to the data server, the message subject to the delete request and a corresponding piece of the identification information, and
wherein the data server includes:
a delete request receiver for receiving the message subject to the delete request and the corresponding piece of the identification information, and
a deleting unit for deleting information indicating an on-state associated with the received piece of the identification information.

9. The information storage system according to claim 1, further comprising:
a terminal unit connected to the data server to be able to perform data communication,
the terminal unit including a display for displaying the message output from the data server.

10. The information storage system according to claim 9, wherein the terminal unit includes:
a delete request acceptor for accepting input of a delete request to delete a displayed message, and a delete request transmitter for transmitting, to the data server, the message subject to the delete request and a corresponding piece of the identification information, and wherein the data server includes:

a delete request receiver for receiving the message subject to the delete request and the corresponding piece of the identification information, and a deleting unit for deleting information indicating an on-state associated with the received piece of the identification information.

11. The information storage system according to claim 1, wherein the terminal unit includes:

a delete request acceptor for accepting input of a delete request to delete a displayed message, and a delete request transmitter for transmitting, to the data server, the message subject to the delete request and a corresponding piece of the identification information, and wherein the data server includes:

a delete request receiver for receiving the message subject to the delete request and the corresponding piece of the identification information, and a deleting unit for deleting information indicating an on-state associated with the received piece of the identification information.

12. The information storage system according to claim 1, wherein the input unit includes a human presence sensor that detects presence of a person, and wherein the input unit is supplied with electric power upon the human detection sensor detecting presence of a person.

13. An information storage method comprising:

accepting, at an input unit, input from a press switch for an on-signal or an off-signal;

transmitting from the input unit to a data server, and receiving at the data server, an on-signal or an off-signal and a piece of the identification information;

storing, at the data server, pieces of the identification information, each identifying one of the press switches, and a corresponding message, outputting, from the data server, the corresponding message in response to the input accepted by each of the switches;

extracting a message associated with the piece of the identification information received together with the on-signal;

determining, at the data server, whether the on-signal and the off-signal for the same piece of the identification information have been received the certain number of times or more in a certain period, and whether the number of times of the reception in the certain period is an odd number or an even number, upon determining that the number of times of the reception in the certain period is an odd number, outputting from the data server the message associated with the received piece of the identification information together with an urgency flag, and upon determining that the number of times of the reception in the certain period is an even number, performing no further action with regard to the received on-signal or off-signal.

14. The information storage method according to claim 13, further comprising storing, for each of the pieces of identification information, information indicating an on-state.

15. The information storage method according to claim 13, further comprising:

storing, upon receipt of the on-signal, information indicating an on-state in association with the piece of the identification information, and determining, upon receipt of the off-signal, whether information indicating an on-state is stored in association with the piece of the identification information and deleting the information indicating an on-state in a case where the information indicating an on-state is stored.

16. The information storage method according to claim 13, further comprising:

displaying, at a terminal unit, the message output from the data server.

17. The information storage method according to claim 13, further comprising:

accepting, at the terminal unit, an input of a delete request to delete a displayed message, and from the terminal unit to the data server, and receiving at the data server, the message subject to the delete request and a corresponding piece of the identification information, and deleting, at the data server, information indicating an on-state associated with the received piece of the identification information.

18. The information storage method according to claim 13, further comprising:

detecting, at the input unit, a presence of a person, and supplying the input unit with electric power upon detecting presence of a person.

* * * * *